(12) United States Patent
Kim et al.

(10) Patent No.: US 8,981,223 B2
(45) Date of Patent: Mar. 17, 2015

(54) SHIELD CONDUCTOR FOR VEHICLE

(75) Inventors: Hyun Wook Kim, Gyeonggi-do (KR); Ki Wook Ohm, Gyeonggi-do (KR); Young Kyoon Jin, Gyeonggi-do (KR)

(73) Assignees: Hyundai Motor Company, Seoul (KR); Kia Motors Coporation, Seoul (KR); Yura Corporation Co., Ltd., Cheongwon-Gun (KR)

( * ) Notice: Subject to any disclaimer, the term of this patent is extended or adjusted under 35 U.S.C. 154(b) by 299 days.

(21) Appl. No.: 13/291,343

(22) Filed: Nov. 8, 2011

(65) Prior Publication Data

US 2013/0049455 A1 Feb. 28, 2013

(30) Foreign Application Priority Data

Aug. 25, 2011 (KR) .................. 10-2011-0085063

(51) Int. Cl.
  *H02G 15/013* (2006.01)
  *B60R 16/02* (2006.01)
  *B60L 3/00* (2006.01)
  *B60L 11/18* (2006.01)

(52) U.S. Cl.
  CPC .......... *H02G 15/013* (2013.01); *B60R 16/0215* (2013.01); *B60L 3/0069* (2013.01); *B60L 11/1803* (2013.01); *Y02T 10/7005* (2013.01)
  USPC ...................................... 174/74 R

(58) Field of Classification Search
  USPC ........................... 174/81, 82, 74 R
  See application file for complete search history.

(56) References Cited

U.S. PATENT DOCUMENTS

| 1,852,381 | A | * | 4/1932 | Teas ................................ 174/82 |
| 5,997,349 | A | * | 12/1999 | Yoshioka ...................... 439/579 |
| 6,034,325 | A | * | 3/2000 | Nattel et al. .................... 174/59 |
| 7,429,193 | B2 | * | 9/2008 | Cairns et al. ................. 439/578 |
| 7,648,373 | B2 | * | 1/2010 | Dixon et al. .................... 439/98 |
| 8,444,325 | B2 | * | 5/2013 | Guest ............................. 385/53 |
| 2011/0067920 | A1 | * | 3/2011 | Toyama et al. ............. 174/72 A |
| 2011/0094796 | A1 | * | 4/2011 | Toyama et al. ............. 174/72 A |

FOREIGN PATENT DOCUMENTS

| JP | 2006310127 A | 11/2006 |
| JP | 2007026821 A | 2/2007 |
| JP | 2007080692 A | 3/2007 |
| JP | 2007157435 A | 6/2007 |

* cited by examiner

*Primary Examiner* — Rexford Barnie
*Assistant Examiner* — Daniel Kessie
(74) *Attorney, Agent, or Firm* — Mintz Levin Cohn Ferris Glovsky and Popeo, P.C.; Peter F. Corless

(57) ABSTRACT

Disclosed is a shield conductor for an electric vehicle or a hybrid vehicle, which includes a protector, a protector closure clip, and a rubber grommet. The protector is formed of aluminum having excellent corrosion resistance and connects a battery pack and a high voltage distribution box and protects shielded and unshielded wires. The protector closure clip is formed of injection molded plastic and is attached to the outside of the protector. The rubber grommet has excellent water-sealing characteristics and surrounds the circumferences of the wires exposed to the outside of the protector. As a result, to the present invention prevents the occurrence of scratches when the wires are inserted into the protector, prevents the wires from being twisted when the protector is bent, and prevents foreign materials or water from being introduced into the protector from the outside.

8 Claims, 3 Drawing Sheets

SHIELD CONDUCTOR FOR VEHICLE

CROSS-REFERENCE TO RELATED APPLICATION

This application claims under 35 U.S.C. §119(a) the benefit of Korean Patent Application No. 10-2011-0085063 filed Aug. 25, 2011, the entire contents of which are incorporated herein by reference.

BACKGROUND (a) Technical Field

The present invention relates to a shield conductor used in a power circuit of a vehicle such as an electric vehicle, a hybrid vehicle, etc. More particularly, it relates to a shield conductor for connecting a battery pack and a high voltage distribution box, which constitute a power circuit of an electric vehicle.

(b) Background Art

Environmentally-friendly vehicles such as hybrid vehicles, electric vehicles, etc., are vehicles which produce fewer environmental emissions than internal combustion engine vehicles and are typically powered (at least in part) by a motor driven by a battery used as a power source rather than purely by an internal combustion engine powered. Due to recent environmental awareness of consumers, the importance of low carbon and high efficiency vehicles has gradually emerged into a growing market due as well to the increase in oil prices.

Electric vehicles are powered by either an AC or DC motor driven by electric power from a battery and include a mechanism for supplying both the power required to drive the vehicle and the power required for electrical and electronic devices mounted in the vehicle using the power generated from a rotor (i.e. coil) of a shaft which is connected to the motor which is configured to generate a driving force.

The motor is connected to an inverter, a battery pack, etc., by an electrical connection line. Here, the battery pack is electrically connected to a high voltage distribution box for supplying electrical power to various electrical loads, and a safe connection line is required for the electrical connection between the battery pack and the high voltage distribution box. Typically, the connection line includes a line having three insulated electrical conductors such as shielded and unshielded conductors, and these conductors are surrounded by an electrical shield as well.

For example, a shield (screen) conductor used in a power circuit of the electric vehicle functions to shield conductors, to prevent thermal damage, and to protect the wires and has a structure in which a plurality of wires are inserted into a cylindrical metal protector. Here, the wires project from both ends of the protector and are connected to various devices. The cylindrical metal protector connects the battery pack and the high voltage distribution box and is bent to avoid interference with peripheral devices and to fit the surface of a vehicle floor panel.

In hybrid vehicles released in at least Korea, a shield member is typically surrounded by a synthetic resin protector to protect the shield member and wires. However, when the synthetic resin protector is used or when the metal protector for surrounding the shielded and unshielded wires is used in foreign vehicles, the number of parts is increased significantly.

Japanese Patent Application Publication Nos. 2007-157435 and 2007-080692 disclose the use of such shield conductors. However, these techniques have the following problems. First, when wires are inserted into a protector, the wires are scratched by sharp edges of both ends of the protector, and when the protector is mounted on the vehicle floor panel and bent to avoid interference with peripheral devices, the wires are twisted within the to protector. Moreover, the shield conductors are vulnerable to the introduction of foreign materials or water, and thus it is very difficult to maintain perfect airtightness therein.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a shield conductor for an electric vehicle or a hybrid vehicle, which includes a protector formed of aluminum having excellent corrosion resistance, the protector connecting a battery pack and a high voltage distribution box and protecting shielded and unshielded wires. Additionally, the protector also includes a protector closure clip formed of injection molded plastic and attached to the outside of the protector, and a rubber grommet which has excellent water-sealing characteristics and is configured to surround the circumferences of the wires exposed to the outside of the protector. As a result, the present invention prevents the occurrence of scratches when the wires are inserted into the protector, prevents the wires from being twisted when the protector is bent, and prevents foreign materials or water from being introduced into the protector from the outside.

In one aspect, the present invention provides a shield conductor for a vehicle, the shield conductor more specifically includes a cylindrical protector, into which shielded and unshielded wires are inserted. The cylindrical protector, in particular, serves as a means for connecting a battery pack and a high voltage distribution box. A protector closure clip which includes a wire aperture, through which the shielded and unshielded wires are inserted, and formed of injection molded plastic, the protector closure clip serving as a means for closing an end of the protector, wherein the protector closure clip is put on the outer circumference of the end of the protector in such a manner that a hook formed on the rear end is fastened to a clip aperture formed in the protector.

In an exemplary embodiment, the wire aperture of the protector closure clip may include three wire receiving grooves which closely receive a portion of the circumference of one shielded wire having a greater diameter and a portion of two unshielded wires having a smaller diameter.

In some exemplary embodiment, the shield conductor may further comprise a grommet mounted to surround the protector closure clip mounted on the end of the protector and the shielded and unshielded wires extending from the end of the protector to the outside, thereby preventing foreign materials or water from being introduced into the protector from the outside. Additionally, the shielded and unshielded wires extending from the end of the protector to the outside may be surrounded by a braid member. Furthermore, the protector may be formed of aluminum having excellent corrosion resistance.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
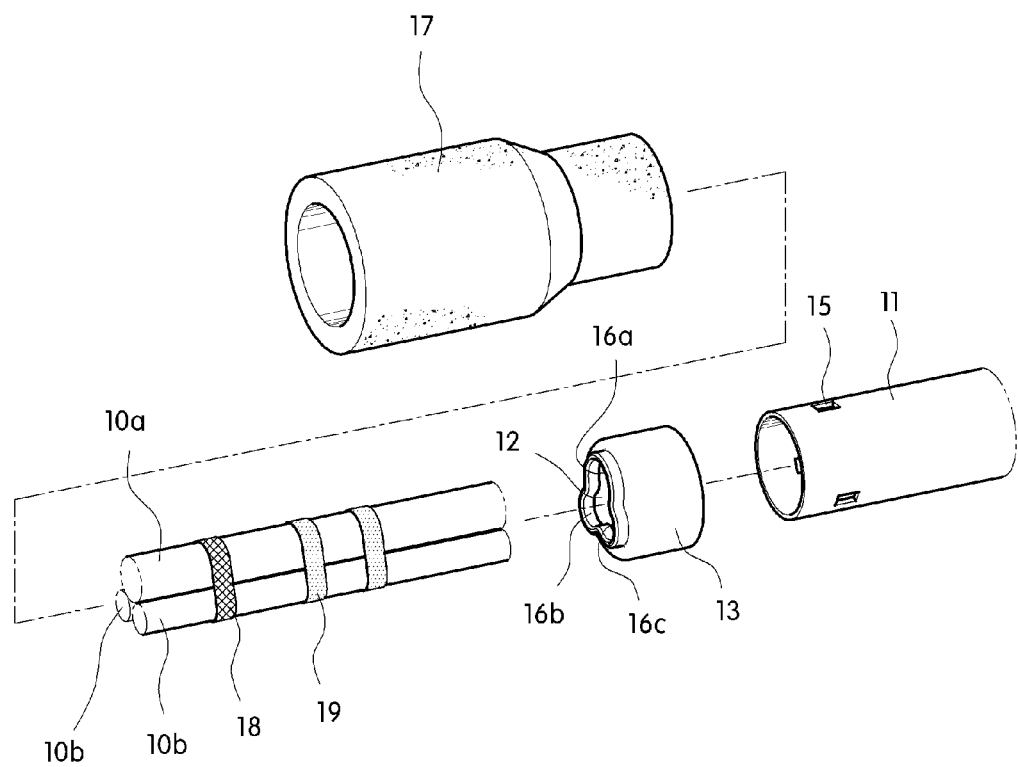
FIG. 1 is an exploded perspective view showing a shield conductor in accordance with an exemplary embodiment of the present invention.

Reference numerals set forth in the Drawings includes reference to the following elements as further discussed below:

10a & 10b: shield and unshielded wires
11: protector
12: wire aperture
13: protector closure clip
14: hook
15: clip aperture
16a, 16b, & 16c: wire receiving grooves
17: grommet
18: braid member
19: resin tape It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 2:
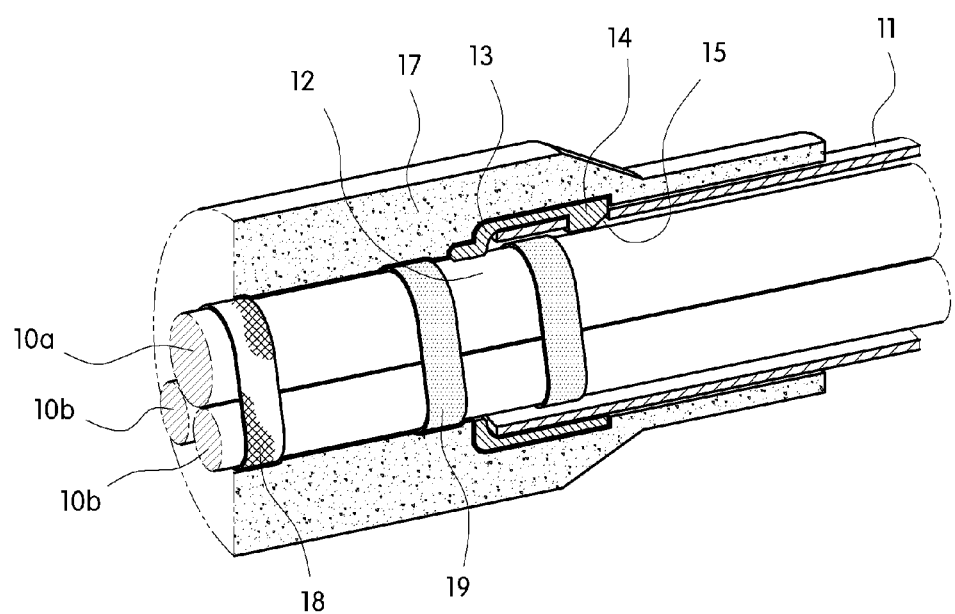
FIG. 2 is a cross-sectional perspective view showing a shield conductor in accordance with an exemplary embodiment of the present invention.

FIG. 1 is an exploded perspective view showing a shield conductor in accordance with an exemplary embodiment of the present invention, and FIG. 2 is a cross-sectional perspective view showing the shield conductor in accordance with the exemplary embodiment of the present invention.

As shown in FIGS. 1 and 2, the shield conductor protects wires via a singular all encompassing shield, not by individual shielding of each wire individually, and has a structure in which an injection molded product is attached to the outside of a cylindrical aluminum protector and a grommet formed of plastic such as ethylene propylene diene monome EPDM is used, thereby preventing the introduction of foreign materials or water. To this end, a cylindrical protector 11 is provided as a means for connecting a battery pack and a high voltage distribution box in a power circuit of a vehicle employing a high voltage battery, such as an electric vehicle, a hybrid vehicle, etc., and shielded and unshielded wires 10a and 10b are inserted into the protector 11 and thereby protected without having to individually shield each wire. Preferably, the protector 11 may be formed of, but not limited to, aluminum which has excellent corrosion resistance.

In particular, a protector closure clip 13, which is an injection molded product made of plastic, is mounted on each end of the protector 11. The protector closure clip 13 is inserted over the outer circumference of at least one end of the protector 11 in such a manner that at least one hook 14 is fastened to clip apertures 15 formed in the protector 11. For example, in some embodiments three hooks 14 may be arranged at intervals of 90°, projecting out from the inside of the receiving end of the closure clip 13 which is receiving the protector 11 to fasten the hooks 14 in the closure apertures 15 of the protector 11.

The protector closure clip 13 has a cylindrical cap like shape, much like the protector 11, and is concentrically disposed on each end of the protector 11 to close the end of the protector 11 by the fastening structure via the hooks 14 and the clip apertures 15.

Moreover, a wire aperture 12 for the insertion of the shielded wire 10a and the unshielded wire 10b is formed on the front end of the protector closure clip 13. Preferably, the wire has a shape that can stably and securely hold a total of three wires, in some embodiments although the design is not limited to this. Preferably, the wire aperture 12 includes three wire receiving grooves 16a, 16b and 16c which can closely receive a portion of the circumference of one shielded wire 10a having a greater diameter and a portion of two unshielded wires 10b having a smaller diameter, that is, on which a portion of the circumference of each wire can be received. The wire receiving grooves 16a, 16b and 16c form the entire inner diameter and are connected as one. Moreover, each of the wire receiving grooves 16a, 16b and 16c may have an arc shape having the same curvature as each wire.

Accordingly, the outer circumferences of the shielded wire 10a and the unshielded wire 10b, which are bound together with a resin tape 19 and inserted into the wire aperture 12, are in close contact with the wire receiving grooves 16a, 16b and 16c. As a result, the protector closure clip 13 of the wire aperture 12 holds the wires 10a and 10b, and thus it is possible to prevent the wires 10a and 10b from being twisted in the protector 11 when the protector 11 is mounted on a vehicle floor panel and bent to avoid interference with peripheral devices. Furthermore, since the protector closure clips 13 are plastic injection molded products which are applied to both ends of the protector 11, it is possible to prevent the occurrence of scratches when the wires 10a and 10b are inserted into the protector 11.

In particular, in the present invention, a rubber grommet 17 is provided as a means for preventing foreign materials or water from being introduced into the protector 11 from the outside. The grommet 17 is configured to surround the protector closure clip 13 mounted on the end of the protector 11 and a predetermined length of the shielded and unshielded wires 10a and 10b extending from the end of the protector 11 to the outside. Preferably, the grommet 17 may be a premolded type grommet mounted in a pressing manner or may be formed by injection molding. Therefore, with the use of the protector closure clip 13 which functions to prevent foreign materials from being introduced into the protector 11 and with the use of the grommet 17 which functions to prevent water from being introduced into the protector 11, it is possible to prevent the introduction of foreign materials and water from coming in contact with the wires.

Moreover, a braid member 18 is wrapped around the shielded and unshielded wires 10a and 10b extending from the end of the protector 11 to the outside, instead of the ground. Preferably, the braid member 18 is interposed between the outer circumferences of the wires 10a and 10b and the inner circumference of the grommet 17 and fixed by a clamp (not shown).

Figure 3:
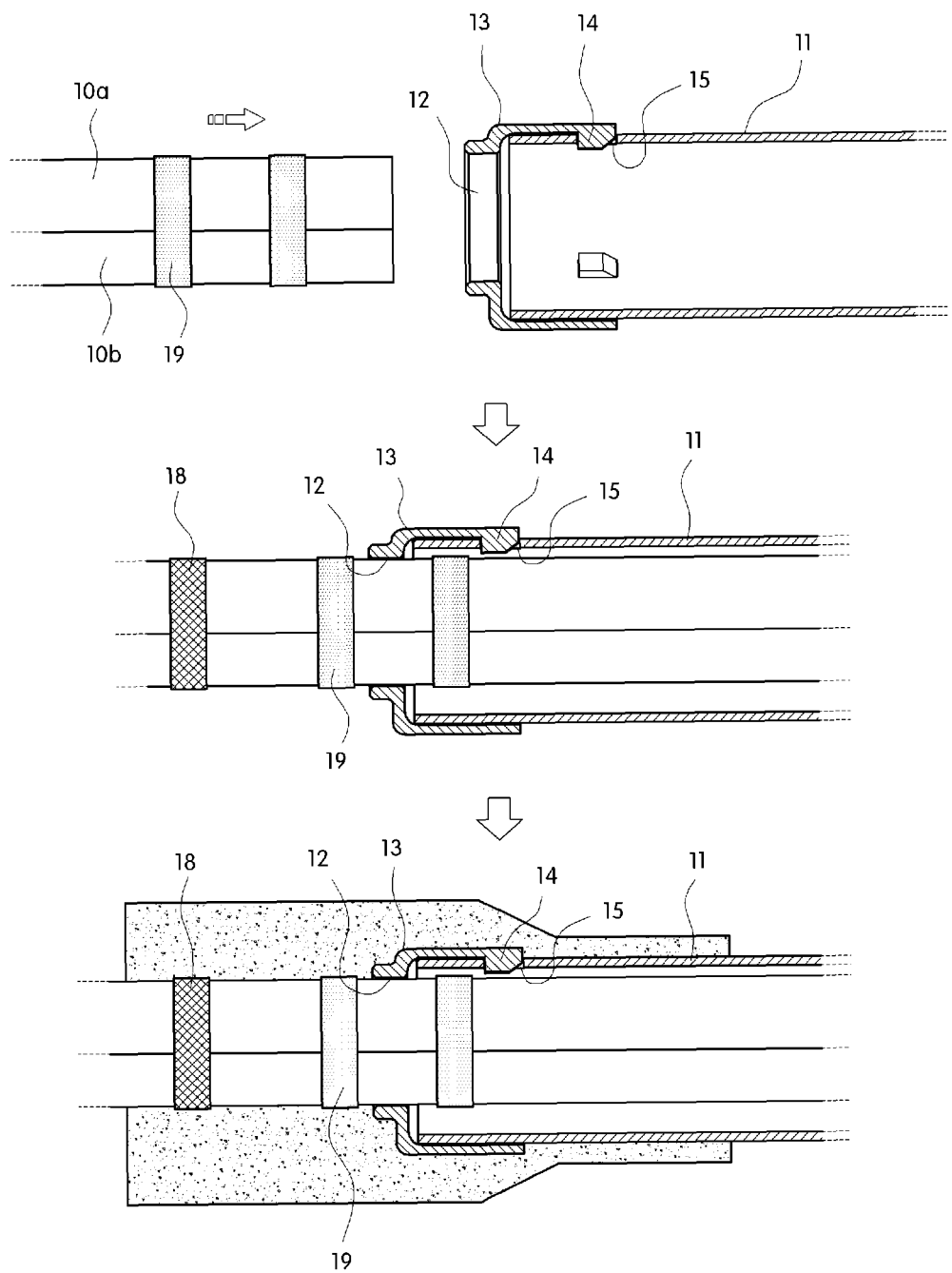
FIG. 3 is a cross-sectional view showing a process of manufacturing a shield conductor in accordance with an exemplary embodiment of the present invention.

FIG. 3 is a cross-sectional view showing a process of manufacturing a shield conductor in accordance with an exemplary embodiment of the present invention. As shown in FIG. 3, first, three strands of shielded and unshielded wires 10a and 10b to be inserted into the protector 11 are bound together and tied with the resin tape 19 at regular intervals. Before the bound wires 10a and 10b are inserted into the protector 11, the protector closure clip 13, an injection molded product, is fastened to the end of the protector 11. That is, the hook 14 of the protector closure clip 13 is fastened to the clip aperture 15 formed in the protector 11 to close the end of the protector 11.

After the protector closure clip 13 is fastened to the protector 11, a bundle of wires 10a and 10b is inserted into the protector 11 through the wire aperture 12 of the protector closure clip 13. Here, the shielded wires 10a and 10b are in contact with the protector closure clip 13 and inserted into the protector 11 while avoiding a sharp end of the protector 11, and thus it is possible to prevent the wires 10a and 10b from being scratched.

After the shielded wires 10a and 10b are inserted into the protector 11, the remaining wires 10a and 10b exposed to the outside of the protector 11 are tied again with the resin tape 19 in front of the protector closure clip 13 to increase the fastening force. Subsequently, the braid member 18 surrounds the circumferences of the wires 10a and 10b extending from the end of the protector 11 to the outside, instead of the ground, and then fixed by the clamp.

After the above operations are completed, the rubber grommet 17 is mounted to surround a predetermined length of the protector 11, the entire length of the protector closure clip 13, and a predetermined length of the shielded and unshielded wires 10a and 10b extending from the end of the protector 11 to the outside so as to prevent foreign materials or water from being introduced into the protector 11 from the outside, thereby preventing the occurrence of corrosion.

As described above, the present invention provides the following advantages.

First, since the end of the conventional protector has a sharp cut edge, wires in the conventional design are often scratched when the wires are inserted into the protector. However, with the use of the injection molded products applied to both ends of the protector, it is possible to prevent the wires from being scratched by the sharp cut edge when the wires are inserted into the protector Second, the injection molded product made of plastic has an aperture having the same diameter as the wires, through which the wires are inserted, and thus it is possible to prevent the inserted wires from being twisted when the protector is bent because they are secured within the injection molded products.

Third, the injection molded product serves to hold the wires, and thus it is possible to regulate the rotation of the protector, thereby reducing the cost for developing a mold. That is, if the injection molded product is not used, it is necessary to add a process of smoothing the surface of an aluminum protector. However, with the use of the injection molded product, it is possible to eliminate this smoothing process thereby decreasing the costs associated with production.

Fourth, the injection molded product mounted on the end of the protector prevents foreign materials from being introduced into the protector, and the grommet prevents water from being introduced into the protector, and thus it is possible to prevent the introduction of foreign materials and water.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A shield conductor for a vehicle, the shield conductor comprising:
   a cylindrical protector formed of aluminum having excellent corrosion resistance, into which shielded and unshielded wires are inserted, the cylindrical protector configured to connect a battery pack and a high voltage distribution box; and
   a protector closure clip including a wire aperture, through which the shielded and unshielded wires are inserted, and formed of injection molded plastic, the protector closure clip configured to seal an end of the protector, the wire aperture comprising wire receiving grooves which are formed on an inner surface of the wire aperture, each of the wire receiving grooves having an arc shape having the same curvature as that of each of the shielded and unshielded wires,
   wherein the protector closure clip is inserted over the outer circumference of the end of the protector in such a manner that a hook formed on the rear end is fastened to a clip aperture formed in the protector, the hook projecting out from the inside of the receiving end of the protector closure clip.

2. The shield conductor of claim 1, wherein the wire aperture of the protector closure clip closely receives a portion of the circumference of the shielded wire having a greater diameter and a portion of the unshielded wires having a smaller diameter.

3. The shield conductor of claim 1, further comprising a grommet configured to surround the protector closure clip mounted on the end of the protector and the shielded and unshielded wires extending from the end of the protector to the outside, to prevent foreign materials or water from being introduced into the protector from the outside.

4. The shield conductor of claim 1, wherein the shielded and unshielded wires extending from the end of the protector to the outside are surrounded by a braid member.

5. A circuit, comprising:
   a battery pack;
   a high voltage distribution box connected to the battery pack via a shield conductor, the shield conductor having:
   a cylindrical protector formed of aluminum having excellent corrosion resistance, into which shielded and unshielded wires are inserted, the cylindrical protector configured to connect a battery pack and a high voltage distribution box; and a protector closure clip including a wire aperture, through which the shielded and unshielded wires are inserted, and formed of injection molded plastic, the protector closure clip configured to seal an end of the protector, the wire aperture comprising wire receiving grooves which are formed on an inner surface of the wire aperture, each of the wire receiving grooves having an arc shape having the same curvature as that of each of the shielded and unshielded wires, wherein the protector closure clip is inserted over the outer circumference of the end of the protector in such a manner that a hook formed on the rear end is fastened to a clip aperture formed in the protector, the hook projecting out from the inside of the receiving end of the protector closure clip.

6. The shield conductor of claim 5, wherein the wire aperture of the protector closure clip receives a portion of the circumference of the shielded wire having a greater diameter and a portion of the unshielded wires having a smaller diameter.

7. The shield conductor of claim 5, further comprising a grommet configured to surround the protector closure clip mounted on the end of the protector and the shielded and unshielded wires extending from the end of the protector to the outside, to prevent foreign materials or water from being introduced into the protector from the outside.

8. The shield conductor of claim 5, wherein the shielded and unshielded wires extending from the end of the protector to the outside are surrounded by a braid member.

* * * * *